United States Patent
Jang et al.

(10) Patent No.: US 12,394,872 B2
(45) Date of Patent: Aug. 19, 2025

(54) BATTERY MODULE AND BATTERY PACK INCLUDING THE SAME

(71) Applicant: LG ENERGY SOLUTION, LTD., Seoul (KR)

(72) Inventors: Sunghwan Jang, Daejeon (KR); Junyeob Seong, Daejeon (KR); Won Kyoung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 730 days.

(21) Appl. No.: 17/737,078

(22) Filed: May 5, 2022

(65) Prior Publication Data
US 2022/0384923 A1   Dec. 1, 2022

(30) Foreign Application Priority Data
May 28, 2021   (KR) .................. 10-2021-0069474

(51) Int. Cl.
*H01M 50/578*   (2021.01)
*H01M 10/48*   (2006.01)
*H01M 50/211*   (2021.01)

(52) U.S. Cl.
CPC ....... *H01M 50/578* (2021.01); *H01M 10/486* (2013.01); *H01M 50/211* (2021.01); *H01M 2200/20* (2013.01)

(58) Field of Classification Search
None
See application file for complete search history.

(56) References Cited

U.S. PATENT DOCUMENTS

| | | |
|---|---|---|
| 2011/0300424 A1 | 12/2011 | Kim et al. |
| 2019/0355959 A1 | 11/2019 | Ro |
| 2020/0176739 A1 | 6/2020 | You et al. |
| 2020/0292626 A1* | 9/2020 | Hemnani ............ G01R 31/006 |
| 2021/0151804 A1* | 5/2021 | You ...................... H01M 50/211 |
| 2021/0167466 A1 | 6/2021 | Choi et al. |
| 2021/0320385 A1* | 10/2021 | Kim .................... H01M 50/284 |
| 2025/0079574 A1* | 3/2025 | Wang .................. H01M 50/249 |
| 2025/0087848 A1* | 3/2025 | Li ....................... H01M 50/516 |

FOREIGN PATENT DOCUMENTS

| | | |
|---|---|---|
| JP | 2014-175329 A | 9/2014 |
| KR | 10-1146363 B1 | 5/2012 |
| KR | 10-2018-0090572 A | 8/2018 |
| KR | 10-2067711 B1 | 1/2020 |
| KR | 10-2020-0067587 A | 6/2020 |
| KR | 10-2020-0068593 A | 6/2020 |
| KR | 10-2020-0080074 A | 7/2020 |
| WO | WO-2020138869 A1 * | 7/2020 ........ H01M 10/0413 |

* cited by examiner

*Primary Examiner* — Scott J. Chmielecki
(74) *Attorney, Agent, or Firm* — Birch, Stewart, Kolasch & Birch, LLP

(57) ABSTRACT

A battery module includes a battery cell stack in which a plurality of battery cells are stacked; a module frame for housing the battery cell stack; end plates located on one side and the other side of the battery cell stack and having a connector opening formed therein; and a module connector exposed through the connector opening, wherein the module connector comprise a body part and an interrupting part surrounding the outer peripheral surface of the body part, and the interrupting part is movable toward the connector opening.

15 Claims, 9 Drawing Sheets

[FIG. 1]
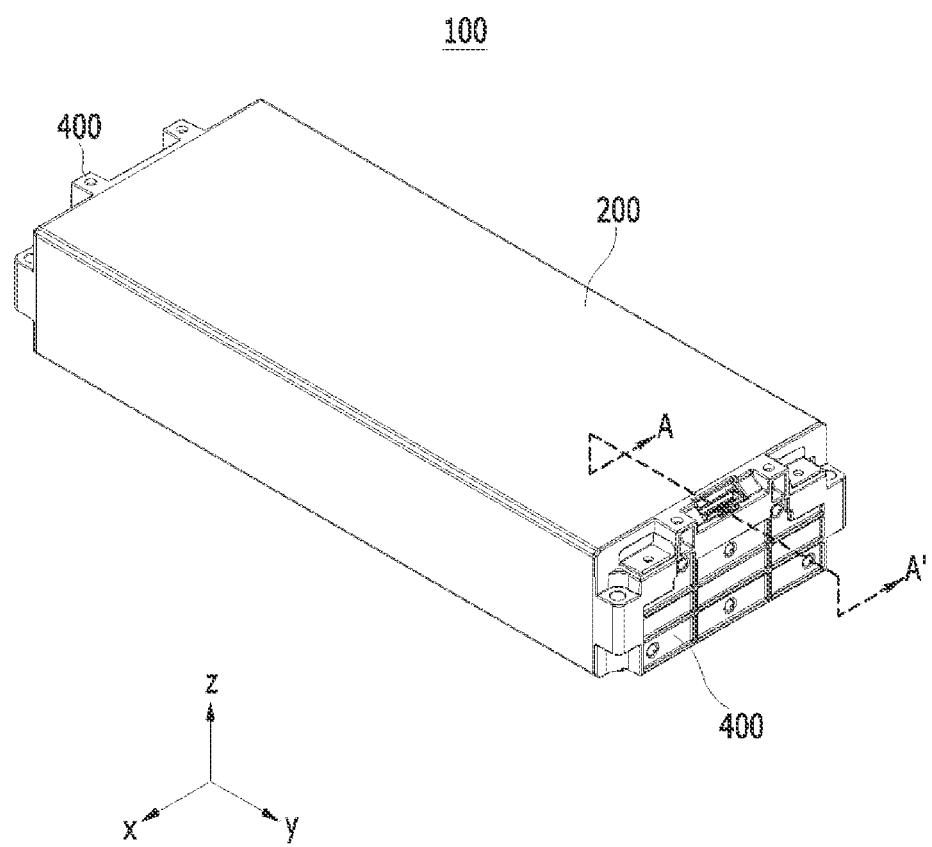

[FIG. 2]
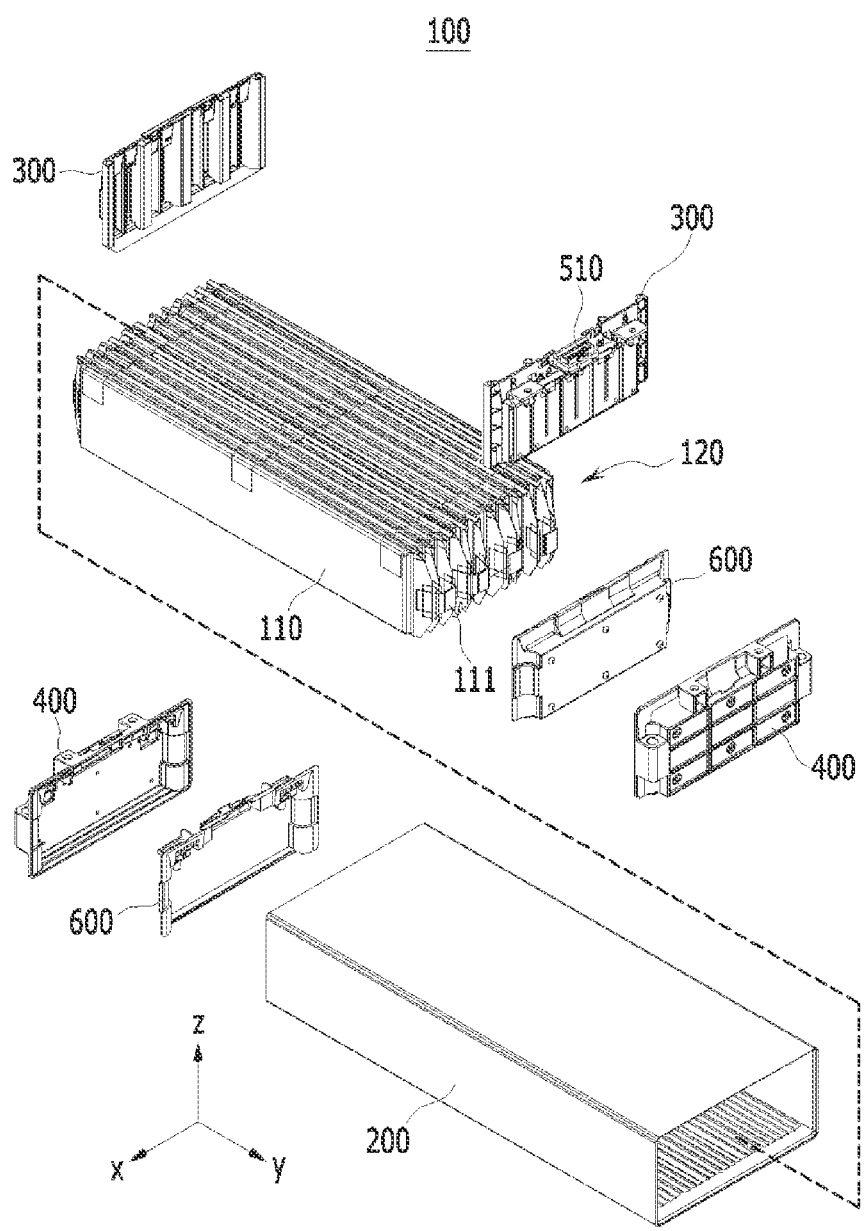

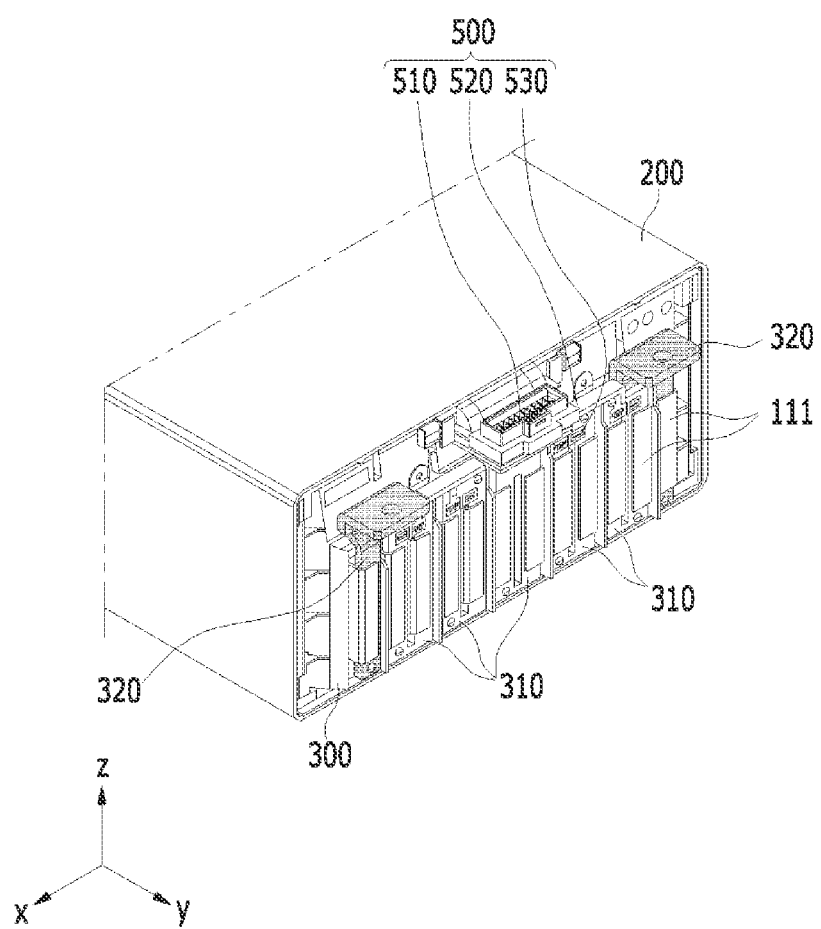
[FIG. 3]

[FIG. 4]
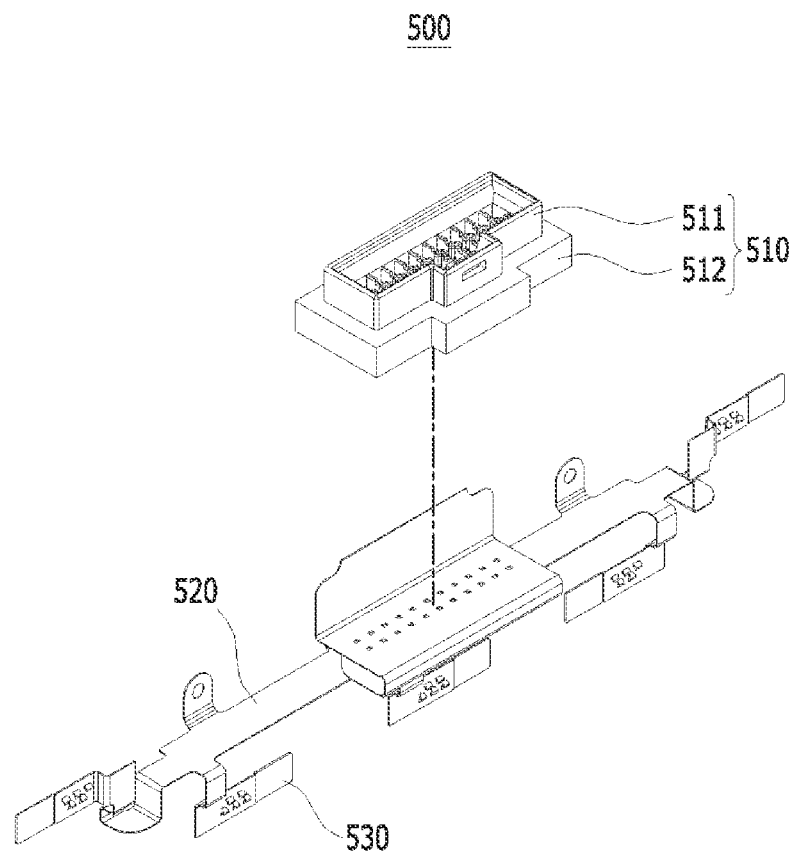

[FIG. 5]
(a)
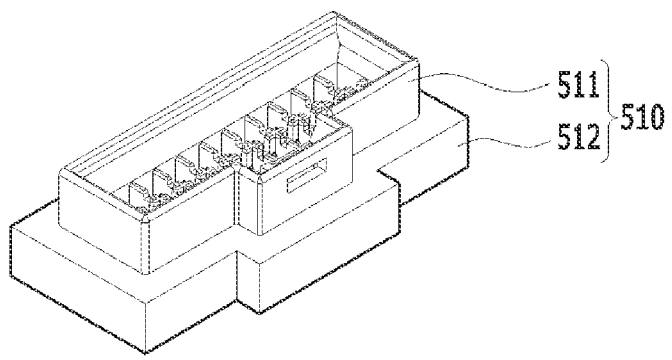
(b)
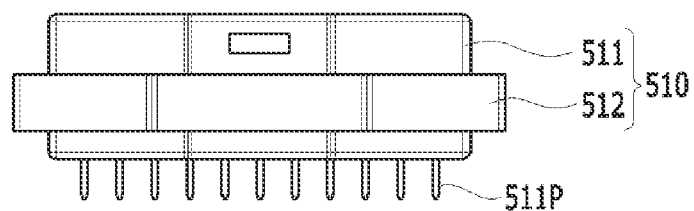

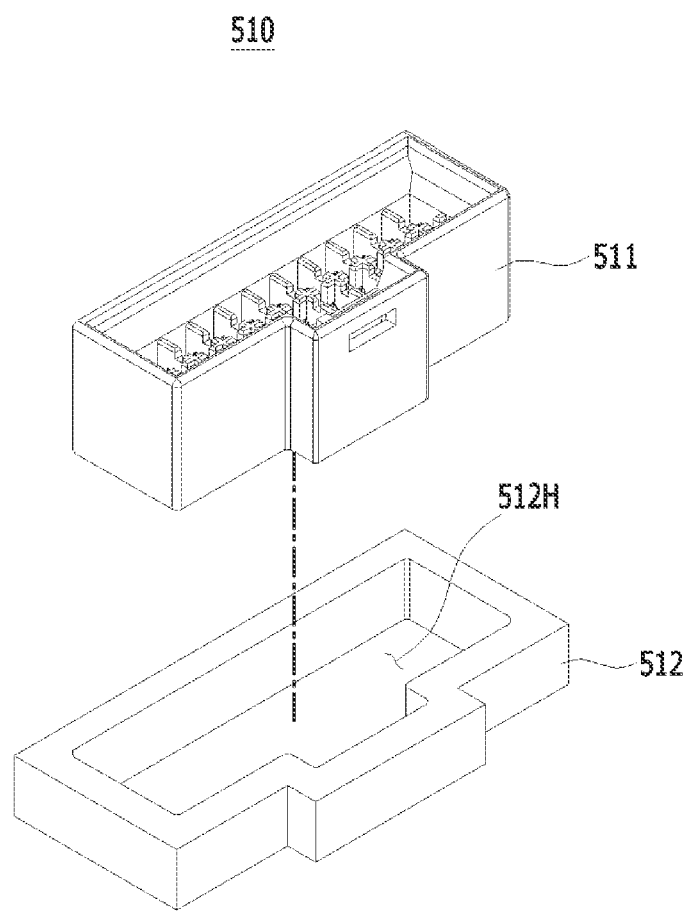
[FIG. 6]

[FIG. 7]
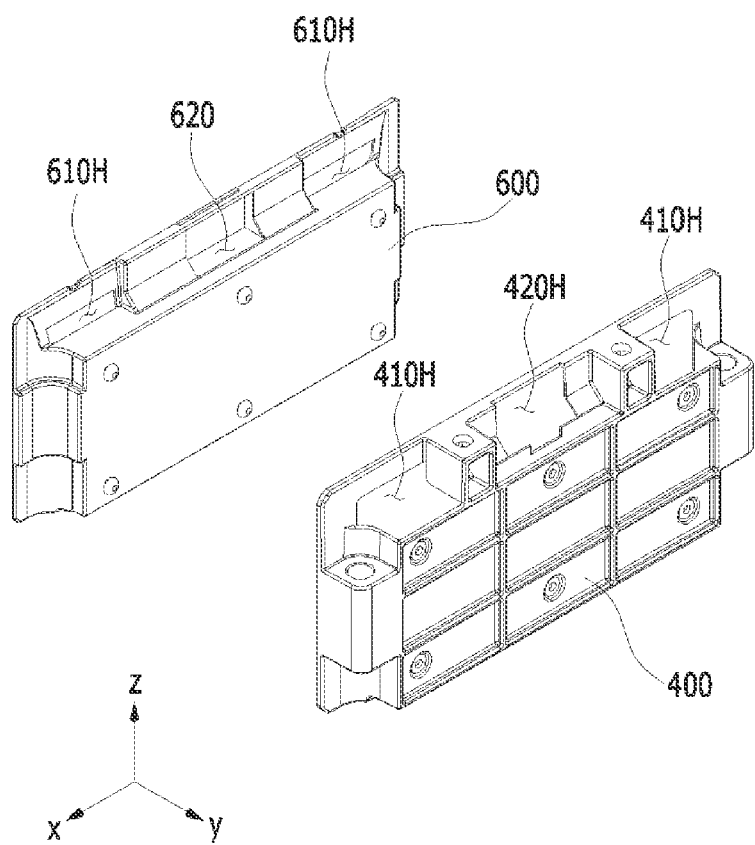

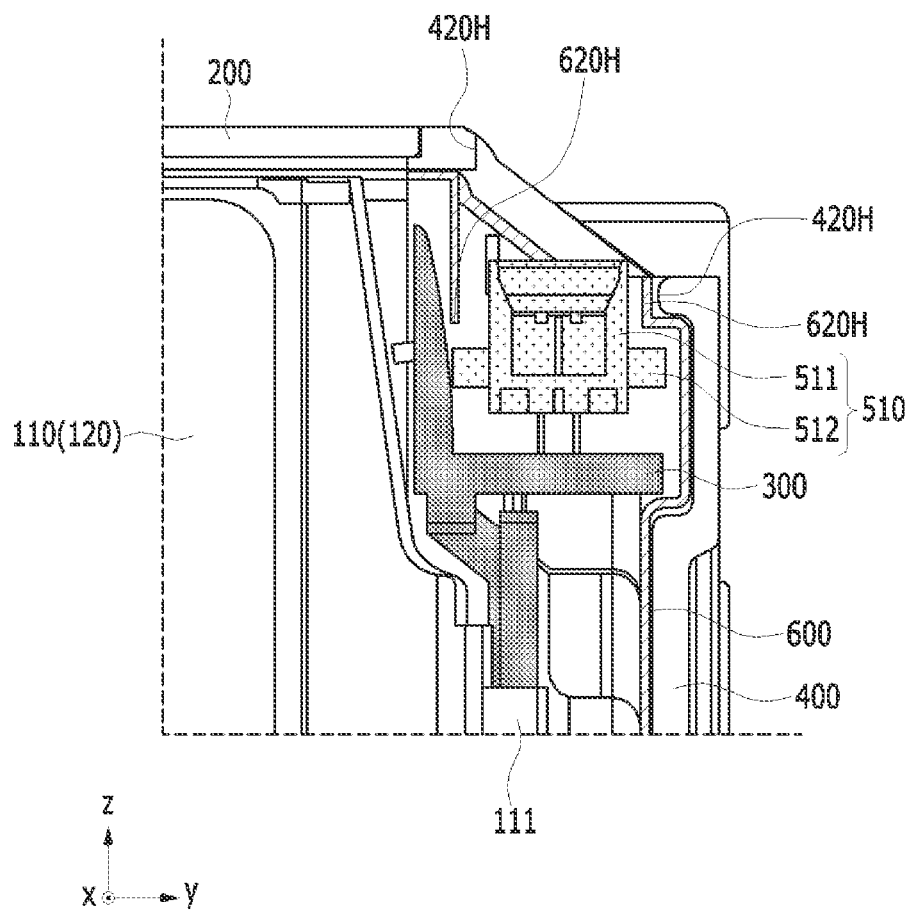
[FIG. 8]

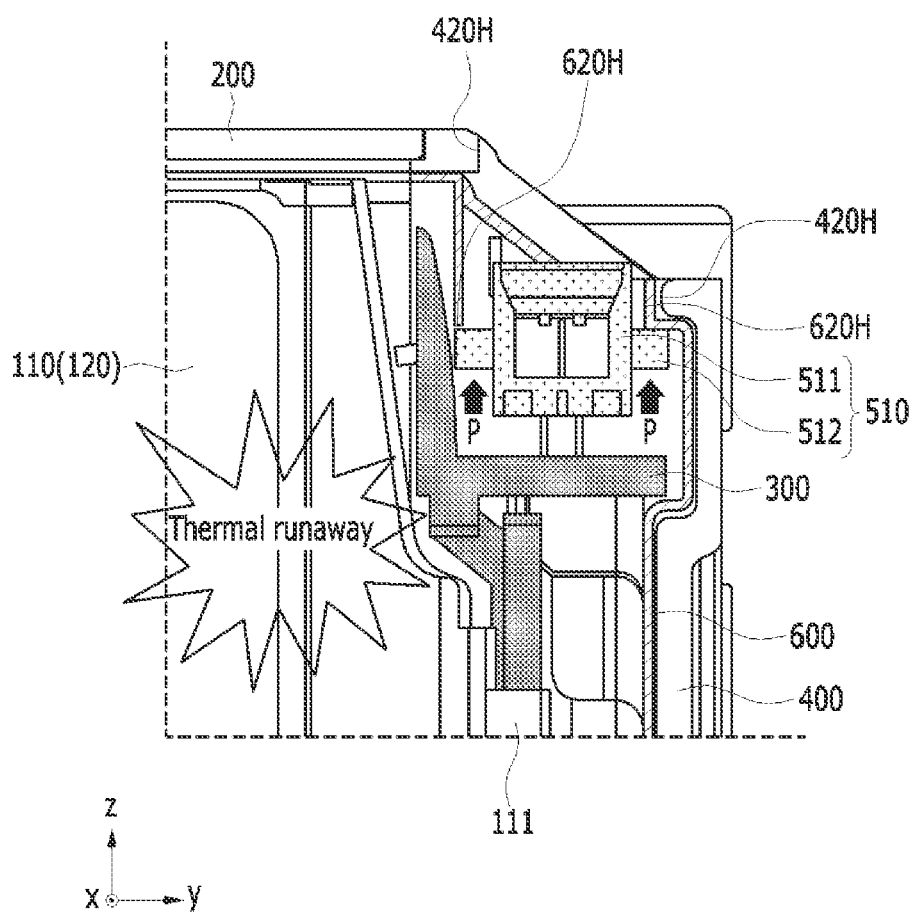
[FIG. 9]

BATTERY MODULE AND BATTERY PACK INCLUDING THE SAME

TECHNICAL FIELD

The present disclosure relates to a battery module and a battery pack including the same, and more particularly, to a battery module that can suppress the propagation of thermal runaway phenomenon, and a battery pack including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate each coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

A battery pack configured to gather a plurality of battery modules can add up heat generated from the large number of battery cells in a narrow space, so that the temperature can rise more quickly and excessively. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a battery module included in a vehicle battery pack, it is frequently exposed to direct sunlight and can be subjected to high-temperature conditions such as summer or desert areas. Further, since a plurality of battery modules are concentratedly arranged to increase the mileage of the vehicle, a thermal runaway phenomenon generated in one battery module can easily propagate to an adjacent battery module, which may eventually lead to ignition or explosion of the battery pack itself.

Therefore, there is a need to design a model that does not lead to a fire or explosion of the battery pack itself, even if a thermal runaway phenomenon occurs in any one battery module.

DETAILED DESCRIPTION OF THE INVENTION

Technical Problem

It is an object of the present disclosure to provide a battery module that can suppress high-temperature gas and flame from being ejected hen a thermal runaway phenomenon occurs within the battery module, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a battery cell stack comprising a plurality of stacked battery cells; a module frame for housing the battery cell stack; end plates located on respective sides of the battery cell stack, a connector opening formed in a first end plate of the end plates; and a module connector exposed through the connector opening, wherein the module connector comprises a body part and an interrupting part surrounding an outer peripheral surface of the body part, and the interrupting part is movable toward the connector opening.

The module connector may be located inside the connector opening.

An insertion hole is formed in the interrupting part, and the body part may be inserted into the insertion hole.

The interrupting part may be movable along the outer peripheral surface of the body part.

The interrupting part may move toward an inner side of the connector opening upon a rise of internal pressure of the module frame.

The battery module may further include a busbar frame located between the battery cell stack and the first end plate.

The battery module may further include an insulation cover located between the busbar frame and the end plate, and a connector opening hole may be in a portion of the insulation cover corresponding to the connector opening.

The interrupting part may be in contact with an inner side of the connector opening hole upon the rise of internal pressure of the module frame.

The connector opening hole may be opened in an upward direction.

The interrupting part may be spaced apart from the connector opening hole in a first position, and the interrupting part may move in an upward direction to a second position to close a gap between the body part and the connector opening hole upon a rise of internal pressure of the module frame.

The battery module may further include a connection cable connected to the module connector, and a joining member for connecting the connection cable and the electrode lead of the battery cell.

The connector opening may be opened in an upward direction.

Advantageous Effects

According to embodiments of the present disclosure, when a thermal runaway phenomenon occurs within the battery module, the pressure inside the battery module rises, which allows the interrupting part of the module connector to move to close a gap formed in the battery module. That is, the gap through which the high-temperature gas and the flame can be ejected can be offset by utilizing the pressure rise inside the battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a battery module according to an embodiment of the present disclosure;

FIG. 2 is an exploded perspective view of the battery module of FIG. 1;

FIG. 3 is a perspective view showing a state in which an end plate and an insulating cover are removed from the battery module according to an embodiment of the present disclosure;

FIG. 4 is a perspective view showing a sensing assembly according to an embodiment of the present disclosure;

FIGS. 5(a) and (b) are perspective views showing a module connector according to an embodiment of the present disclosure;

FIG. 6 is a perspective view showing a state where the module connector according to an embodiment of the present disclosure is disassembled;

FIG. 7 is a perspective view showing an end plate and an insulation cover according to an embodiment of the present disclosure; and FIGS. 8 and 9 are partial cross-sectional views showing a cross-section taken along the cutting line A-N of FIG. 1.

Detailed Description of the Embodiments

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a perspective view of a battery module according to an embodiment of the present disclosure. FIG. 2 is an exploded perspective view of the battery module of FIG. 1.

Referring to FIGS. 1 and 2, the battery module 100 according to an embodiment of the present disclosure includes a battery cell stack 120 in which a plurality of battery cells 110 are stacked; a module frame 200 for housing the battery cell stack 120; and end plates 400 located on one side and the other side of the battery cell stack 120.

First, the battery cell 110 is preferably a pouch-type battery cell. Such a battery cell 110 may be formed in a rectangular sheet-like structure. For example, the battery cell 110 according to the present embodiment has a structure in which the two electrode leads 111 face each other and protrude on one side and the other side, respectively. More specifically, the electrode leads 111 are connected to an electrode assembly (not shown) and are protruded from the electrode assembly (not shown) to the outside of the battery cell 110.

Meanwhile, the battery cell 110 may be manufactured by thermally fusing the outer periphery of the pouch-type cell case in a state in which an electrode assembly (not shown) is housed in the pouch-type cell case. The pouch-type cell case may be formed of a laminate sheet including a resin layer and a metal layer.

Meanwhile, only the battery cell 110 having a structure in which the electrode lead 111 protrudes in both directions on one side and the other side has been described, but it goes without saying that in another embodiment of the present disclosure, a unidirectional pouch-type battery cell in which electrode leads protrude together in one direction is also possible.

The battery cell 110 may be configured by a plurality of numbers, and the plurality of battery cells 110 may be stacked along one direction so as to be electrically connected to each other, thereby forming a battery cell stack 120. For example, as shown in FIG. 2, a plurality of battery cells 110 may be stacked along a direction parallel to the x-axis. The pouch-type cell case is generally formed of a laminate structure of a resin layer/metallic thin film layer/resin layer.

For example, a surface of the pouch-type cell case formed of an O(oriented)-nylon layer tends to slide easily by an external impact when a plurality of battery cells are stacked to form a medium or large-sized battery module. Therefore, in order to prevent this sliding and maintain a stable stacked structure of the battery cells, an adhesive member, for example, a sticky adhesive such as a double-sided tape or a chemical adhesive coupled by a chemical reaction upon adhesion can be attached to the surface of the battery case to form the battery cell stack 120.

The battery cell stack 120 is housed in the module frame 200. The module frame 200 may be a metal frame of which both surfaces are opened. More specifically, the module frame 200 may be opened in both directions in which the electrode leads 111 protrude with reference to the battery cell stack 120. However, the module frame 200 shown in FIG. 2 is an exemplary structure, and the form thereof is not particularly limited as long as it can house the battery cell stack 120. The module frame 200 of FIG. 2 is shown as a mono frame in the form of a metal plate in which the upper surface, the lower surface and both side surfaces are integrated, but a form in which an upper cover is joined to a U-shaped frame with an open upper part, a form in which a U-shaped frame and an inverted U-shaped frame are coupled with each other, or the like are possible.

End plates 400 are located on one side and the other side of the battery cell stack 120. That is, the end plates 400 may be located on the opened both surfaces of the module frame 200.

The module frame 200 and the end plate 400 can be joined by welding or the like in a state in which the corresponding corner portions are in contact with each other. However, this is an exemplary method, and bolt fastening, hook fastening, or the like can be applied as a mechanical coupling form. The battery cell stack 120 is housed in the space formed by the module frame 200 and the end plate 400, thereby capable of physically protecting the battery cell stack 120. For this purpose, the module frame 200 and the end plate 400 may include a metal material having a predetermined strength such as aluminum or a plastic material.

Meanwhile, the battery module 100 according to the present embodiment may include a busbar frame 300 located between the battery cell stack 120 and the end plate 400, and an insulation cover 600 located between the busbar frame 300 and the end plate 400. That is, the busbar frame 300, the insulation cover 600, and the end plate 400 may be sequentially located from the battery cell stack 120 to the outside. Similarly to the end plate 400, the busbar frame 300 and the insulation cover 600 may each be configured by a plurality of numbers.

Next, a connector opening formed in the busbar frame, the module connector, and the end plate according to the present embodiment will be described in detail with reference to FIGS. 3 to 7, and the like.

FIG. 3 is a perspective view showing a state in which an end plate and an insulating cover are removed from the battery module according to an embodiment of the present disclosure. FIG. 4 is a perspective view showing a sensing assembly according to an embodiment of the present disclosure.

First, referring to FIGS. 2 to 4, the battery module 100 according to an embodiment of the present disclosure includes a module connector 510. Further, a connector opening 420H is formed in the end plate 400, and the module connector 510 is exposed through the connector opening 420H.

Specifically, the battery module 100 according to the present embodiment may include a sensing assembly 500 for sensing connection of the battery module 100. Here, the sensing assembly 500 is for connecting LV (Low voltage), wherein the LV connection means a sensing connection for sensing and controlling the voltage and temperature of the battery cell. The voltage information and temperature information of the battery cell 110 can be measured through the sensing assembly 500 and transmitted to an external BMS (battery management system). The sensing assembly 500 according to the present embodiment may include a module connector 510, a connection cable 520, and a joining member 530.

Meanwhile, the battery module 100 according to the present embodiment may include a busbar 310 and a terminal busbar 320. The busbar 310 and the terminal busbar 320 may be mounted on the busbar frame 300.

The busbar 310 and the terminal busbar 320 may be joined to the electrode lead 111 of the battery cells 110 in order to electrically connect the plurality of battery cells 110. Specifically, the busbar frame 300 on which the busbar 310 and the terminal busbar 320 are mounted may be located on one side (y-axis direction) and the other side (−y-axis direction) of the battery cell stack 120, respectively. The one side (y-axis direction) and the other side (−y-axis direction) of the battery cell stack 120 correspond to the direction in which the electrode lead 111 of the battery cells 110 protrudes. That is, as described above, any one busbar frame 300 may be located between any one of the end plates 400 and the battery cell stack 120.

A lead slit may be formed at the busbar frame 300, and the electrode leads 111 can be bent after passing through the lead slit, and joined to the busbar 310 or the terminal busbar 320. As long as physical and electrical connection is possible, the joining method is not particularly limited, and weld-joining can be performed as an example. The electrode leads 111 can be electrically connected via the busbar 310.

Meanwhile, a portion of the terminal busbar 320 is exposed to the outside of the battery module 100. Specifically, an opening 410H is formed in the end plate 400, and a portion of the terminal busbar 320 is exposed through the opening 410H.

A portion of the terminal bus bar 320 exposed to the outside of the battery module 100 can be connected to another battery module or a BDU (battery disconnect unit) or the like to form a high voltage (HV) connection. Here, the HV connection is a connection that plays a role of a power source for supplying electric power, and refers to a connection between battery cells or a connection between battery modules. That is, the battery module 100 may be electrically connected to other adjacent battery modules via the terminal bus bar 320.

Next, the sensing assembly 500 according to the present embodiment will be described in detail with reference to FIGS. 4 to 7. FIGS. 5(*a*) and (*b*) are perspective views showing a module connector according to an embodiment of the present disclosure. FIG. 6 is a perspective view showing a state where the module connector according to an embodiment of the present disclosure is disassembled. FIG. 7 is a perspective view showing an end plate and an insulation cover according to an embodiment of the present disclosure.

Referring to FIGS. 4 to 7, the module connector 510 is configured to transmit/receive signals to and from an external control device. A connector opening 420H is formed in the end plate 400, and the module connector 510 is exposed to the outside of the battery module 100 through this connector opening 420H, and the module connector 510 can be connected to an external BMS.

A portion in which the module connector 510 can be seated may be provided at an upper portion of the busbar frame 300. That is, the module connector 510 as well as the busbar 310 and the terminal busbar 320 may be mounted on the busbar frame 300.

The connection cable 520 is a configuration that connects the module connector 510 and the joining member 530, and may be a flexible printed circuit board (FPCB) or a flexible flat cable (FFC). The module connector 510 and the connection cable 520 may be located at the upper end of the busbar frame 300.

The joining member 530 may be connected to one end of the connection cable 520, and the joining member 530 can electrically connect the connection cable 520 and the electrode lead 111 of the battery cells 110. Specifically, the electrode lead 111 may be joined to one portion of the busbar 310, and the joining member 530 may be joined to another portion of the busbar 310. A weld joining can be utilized for the joining.

Voltage information on the plurality of battery cells 110 passes through the joining member 530, the connection cable 520, and the module connector 510 in sequence, and is transmitted to an external BMS (Battery Management System).

Although not specifically shown in the figure, a temperature sensor may be provided on a part of the connection cable 520. Temperature information inside the battery module 100 through such a temperature sensor may pass through a connection cable 520 and a module connector 510 in sequence and may be transmitted to an external BMS (Battery Management System).

In this manner, the sensing assembly 500 may detect and control phenomena such as overvoltage, overcurrent, and overheating of each battery cell 110.

Meanwhile, as described above, the battery module 100 according to the present embodiment may include an insulation cover 600 located between the busbar frame 300 and the end plate 400. The insulation cover 600 is preferably formed by a plurality of numbers. Insulation cover 600 may include a material having electrical insulation, and interrupts the busbar 310 or the terminal busbar 320 from contacting with the end plate 400.

Referring to FIGS. 3 and 7 together, a connector opening hole 620H may be formed in a portion of the insulation cover 600 corresponding to the connector opening 420H of the end plate 400. Also, an opening hole 610H may be formed in a portion of the insulation cover 600 corresponding to the opening 410H of the end plate 400.

The module connector 510 according to the present embodiment may be exposed to the outside of the battery module 100 through the connector opening hole 620H of the insulation cover 600 and the connector opening 420H of the end plate 400. Further, the terminal busbar 320 may be exposed to the outside of the battery module 100 through the opening 610H of the insulation cover 600 and the opening 410H of the end plate 400.

Meanwhile, the terminal busbar 320 is configured by a plurality of numbers, one of which may function as a positive electrode terminal of the battery module 100, and the other one may function as a negative electrode terminal of the battery module 100. Thereby, each of the opening 410H and the opening hole 610H may be configured by a plurality of numbers.

Referring to FIGS. 5 and 6, the module connector 510 according to the present embodiment includes a body part 511 and an interrupting part 512 surrounding the outer peripheral surface of the body part 511.

The body part 511 is a configuration into which a connection member (not shown) connected to an external BMS is inserted, and can be connected to the connection cable 520 through a pin 511P provided on the lower surface. However, the case where the pin 511P is formed is one example, and other module connectors in which the pin 511P is not formed are also applicable.

The interrupting part 512 is a structure separate from the body part 511, and is not a structure fixed to the body part 511. That is, the insertion hole 512H may be formed in the interrupting part 512, and the body part 511 may be inserted into the insertion hole 512H. Therefore, the interrupting part 512 is movable along the outer peripheral surface of the body part 511.

In the battery module 100 provided with the module connector 510, the interrupting part 512 is movable toward the connector opening 420H of the end plate 400.

Next, the function of the module connector according to an embodiment of the present disclosure will be described in detail with reference to FIGS. 5 to 9.

FIGS. 8 and 9 are partial cross-sectional views showing a cross-section taken along the cutting line A-A' of FIG. 1. Particularly, FIG. 8 is a cross-sectional view showing a battery module in a normal time, and FIG. 9 is a cross-sectional view showing a state in which a thermal runaway phenomenon occurs in a battery module.

Referring to FIGS. 5 to 9, the interrupting part 512 according to the present embodiment moves to interrupt the connector opening 420H upon the rise of internal pressure of the module frame 200. The internal pressure of the module frame 200 means the air pressure of the inner space of the module frame 200 in which the battery cell stack 120 is housed. The internal pressure rise of the module frame 200 means that a large amount of gas is generated in the inner space of the module frame 200.

Specifically, the module connector 510 may be located inside the connector opening 420H, and the interrupting part 512 that is not fixed to the body part 511 is movable toward the connector opening 420H of the module connector 510. The interrupting part 512 may move toward the inner side of the connector opening 420H upon the rise of internal pressure of the module frame 200.

In particular, the connector opening 420H may be opened in an upward direction. As shown in FIG. 8, the interrupting part 512 of the module connector 510 is spaced apart from the connector opening 420H in a normal time. As shown in FIG. 9, when the internal pressure of the module frame 200 rises due to a thermal runaway phenomenon, or the like, the interrupting part 512 of the module connector 510 may move in an upward direction to close the connector opening 420H.

A thermal runaway phenomenon may occur in the battery cells 110 inside the battery module 100. One example of a thermal runaway phenomenon is as follows. The physical, thermal, and electrical damage to the battery cell 110 including overcharging may occur, thereby increasing the internal pressure of the battery cell 110. When the fusion strength limit value of the pouch-type cell case of the battery cell 110 is exceeded, high-temperature heat, venting gas, and the like generated in the battery cell 110 may be ejected to the outside of the battery cell 110.

The thermal runaway phenomenon generated in any one battery cell can be extended to other battery cells by the convection effect, and eventually, high-temperature gas and flame may be generated inside the battery module 100. The generated high-temperature gas and flame may be ejected to the outside through the connector opening 420H of the end plate 400, and it may damage adjacent battery modules or cause another thermal runaway phenomenon of the adjacent battery module. Ultimately, the thermal runaway phenomenon may propagate to a plurality of battery modules, which may cause explosion and ignition of the battery pack.

Thus, the battery module 100 according to the present embodiment is configured such that the interrupting part 512 can move in accordance with an increase in the internal pressure of the module frame 200. As shown in FIG. 9, when a thermal runaway occurs, gas is ejected from the battery cells, and the internal pressure of the module frame 200 is increased. Due to this increased internal pressure P, the interrupting part 512 moves toward the connector opening 420H, and eventually, the gap of the connector opening 420H may be closed.

Therefore, it is possible to suppress the high temperature gas or flame from being ejected to the outside of the battery module 100. That is, the gap through which high-temperature gas and flame may be ejected may be offset by increasing the internal pressure of the battery module 100. Ultimately, it is possible to prevent the thermal runaway phenomenon generated in one battery module from propagating to other battery module.

As described above, a connector opening hole 620H may be formed in a portion of the insulation cover 600 corresponding to the connector opening 420H. The connector opening hole 620H may be opened in an upward direction. In this case, the inner side of the connector opening hole 620H may be located closer to the module connector 510 than the inner side of the connector opening 420H to ensure insulation. The interrupting part 512 may be in close contact with the inner side of the connector opening hole 620H upon the rise of internal pressure of the module frame 200.

In other words, the interrupting part 512 may be spaced apart from the connector opening hole 620H in a normal time, and when the internal pressure of the module frame 200 rises due to the thermal runaway phenomenon, the interrupting part 512 moves in an upward direction and is in close contact with the inner side of the connector opening hole 620H to close the gap between the body part 511 and the connector opening hole 620H. By the operating principle of the module connector 510, it is possible to prevent high-temperature gas or flame from being ejected to the outside of the battery module 100.

Even though the terms indicating directions such as front, rear, left, right, upper and lower directions are used herein, it is obvious to those skilled in the art that these merely represent relative positions for convenience in explanation and may vary depending on a position of an observer, a position of an object, or the like.

The one or more battery modules according to the present embodiment as described above can be mounted together with various control and protection systems such as a battery management system (BMS) and a cooling system to form a battery pack.

The battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements can be designed by those skilled in the art using the basic concepts of the present disclosure defined in the following claims, which also falls within the spirit and scope of the present disclosure.

DESCRIPTION OF REFERENCE NUMERALS

100: battery module
120: battery cell stack
200: module frame
300: busbar frame
400: end plate
420H: connector opening
510: module connector

The invention claimed is:

1. A battery module comprising:
a battery cell stack comprising a plurality of stacked battery cells;
a module frame for housing the battery cell stack;
end plates located on respective sides of the battery cell stack;
a connector opening formed in a first end plate of the end plates; and
a module connector exposed through the connector opening,
wherein the module connector comprises a body part and an interrupting part surrounding an outer peripheral surface of the body part,
wherein the interrupting part is movable toward the connector opening, and
wherein the interrupting part moves toward an inner side of the connector opening upon a rise of internal pressure of the module frame.

2. The battery module according to claim 1, wherein the module connector is located inside the connector opening.

3. The battery module according to claim 2, wherein an insertion hole is formed in the interrupting part, and the body part is inserted into the insertion hole.

4. The battery module according to claim 1, wherein the interrupting part is movable along the outer peripheral surface of the body part.

5. The battery module according to claim 1, further comprising a busbar frame located between the battery cell stack and the first end plate.

6. A battery module comprising:
a battery cell stack comprising a plurality of stacked battery cells;
a module frame for housing the battery cell stack;
end plates located on respective sides of the battery cell stack;
a connector opening formed in a first end plate of the end plates;
a module connector exposed through the connector opening;
a busbar frame located between the battery cell stack and the first end plate;
an insulation cover located between the busbar frame and the first end plate; and
a connector opening hole in a portion of the insulation cover corresponding to the connector opening,
wherein the module connector comprises a body part and an interrupting part surrounding an outer peripheral surface of the body part, and
wherein the interrupting part is movable toward the connector opening.

7. The battery module according to claim 6, wherein the interrupting part is in contact with an inner side of the connector opening hole upon a rise of internal pressure of the module frame.

8. The battery module according to claim 6, wherein the connector opening hole is opened in an upward direction.

9. The battery module according to claim 6, wherein the interrupting part is spaced apart from the connector opening hole in a first position, and
wherein the interrupting part moves in an upward direction to a second position to close a gap between the body part and the connector opening hole upon a rise of internal pressure of the module frame.

10. The battery module according to claim 9, wherein an inner side of the connector opening hole is located closer to the module connector than the inner side of the connector opening.

11. The battery module according to claim 1, further comprising a connection cable connected to the module connector, and a joining member for connecting the connection cable and an electrode lead of a battery cell of the battery cell stack.

12. The battery module according to claim 11, wherein a temperature sensor is provided on a part of the connection cable.

13. The battery module according to claim 1, wherein the connector opening is opened in an upward direction.

14. The battery module according to claim 1, wherein the connector opening has a bottom edge, and
wherein the interrupting part has a first position spaced from the bottom edge of the connector opening and a second position having a top surface of the interrupting part contacting the bottom edge of the connector opening.

15. A battery pack comprising the battery module as set forth in claim 1.

* * * * *